(12) United States Patent
Bender

(10) Patent No.: US 9,296,478 B2
(45) Date of Patent: Mar. 29, 2016

(54) AIRCRAFT HAVING AT LEAST TWO AIRCRAFT FUSELAGES AND A FIRST WING ARRANGEMENT WITH AT LEAST TWO WING SECTIONS THAT ARE NOT CONNECTED TO EACH OTHER

(71) Applicant: AIRBUS OPERATIONS GMBH, Hamburg (DE)

(72) Inventor: Klaus Bender, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 326 days.

(21) Appl. No.: 13/760,006

(22) Filed: Feb. 5, 2013

(65) Prior Publication Data

US 2013/0256451 A1  Oct. 3, 2013

Related U.S. Application Data

(60) Provisional application No. 61/595,369, filed on Feb. 6, 2012.

(30) Foreign Application Priority Data

Feb. 6, 2012 (DE) .......................... 10 2012 002 310

(51) Int. Cl.
*B64C 39/04* (2006.01)
*B64C 39/00* (2006.01)

(52) U.S. Cl.
CPC ................. *B64C 39/04* (2013.01); *B64C 39/00* (2013.01)

(58) Field of Classification Search
CPC ................................ B64C 39/00; B64C 39/04
See application file for complete search history.

(56) References Cited

U.S. PATENT DOCUMENTS 3,884,432 A 5/1975 Blanchard et al.
2010/0044521 A1* 2/2010 Wilby ........................... 244/4 R

* cited by examiner

*Primary Examiner* — Nicholas McFall
(74) *Attorney, Agent, or Firm* — Ingrassia Fisher & Lorenz, P.C.

(57) ABSTRACT

An aircraft having at least two separate aircraft fuselages is provided. The aircraft includes a first wing arrangement with at least two non-connected wing sections, and a second wing. In each case the wing sections of the first wing arrangement extend from the outside of an aircraft fuselage towards the outside. The second wing is arranged between insides of the at least two aircraft fuselages. Connecting regions of the first wing arrangement and of the second wing are arranged so as to be offset relative to each other at least on an X-Z-plane of an aircraft-fixed coordinate system. Consequently, the first wing arrangement and the second wing do not influence each other as a result of downwash, and in addition it is possible to do without horizontal stabilizer units that generate downthrust.

13 Claims, 5 Drawing Sheets

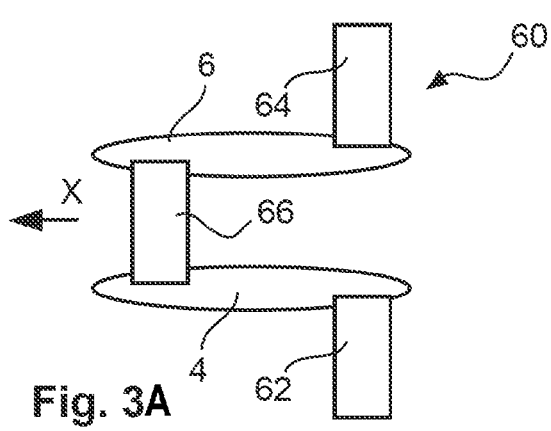
Fig. 3A
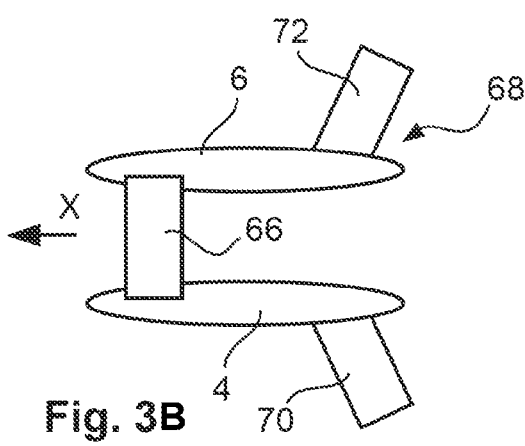
Fig. 3B
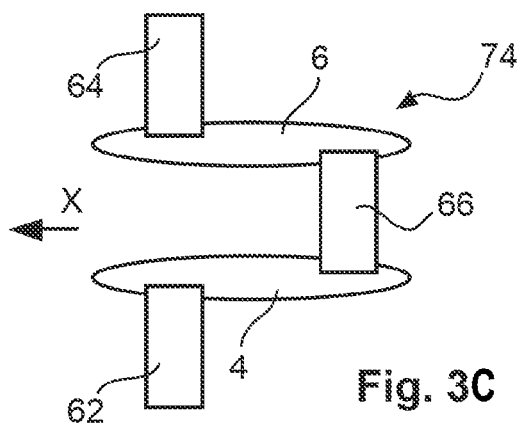
Fig. 3C
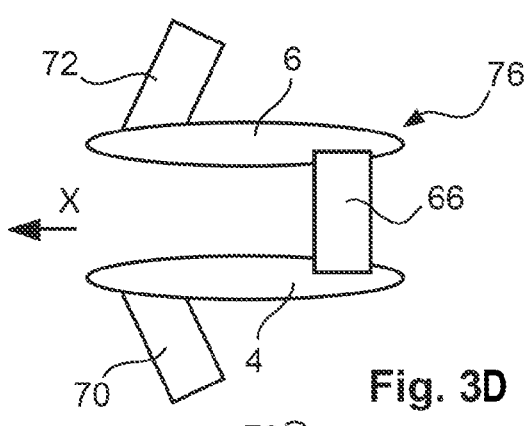
Fig. 3D
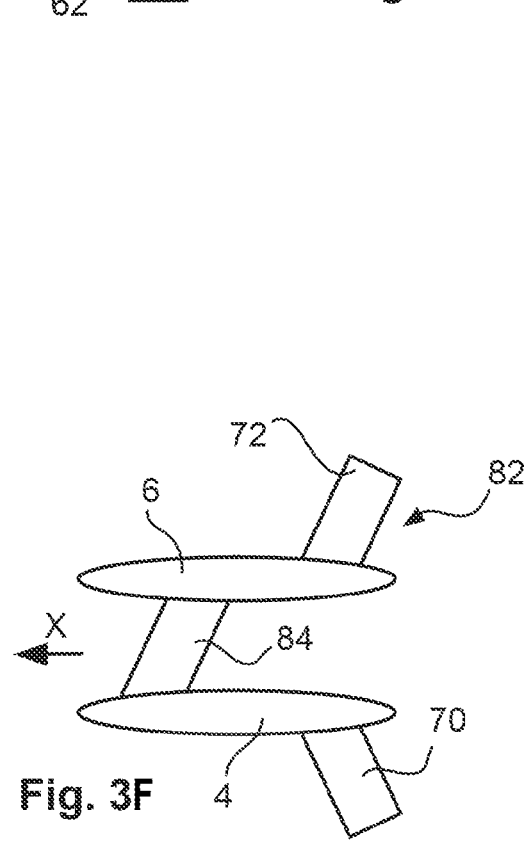
Fig. 3E
Fig. 3F
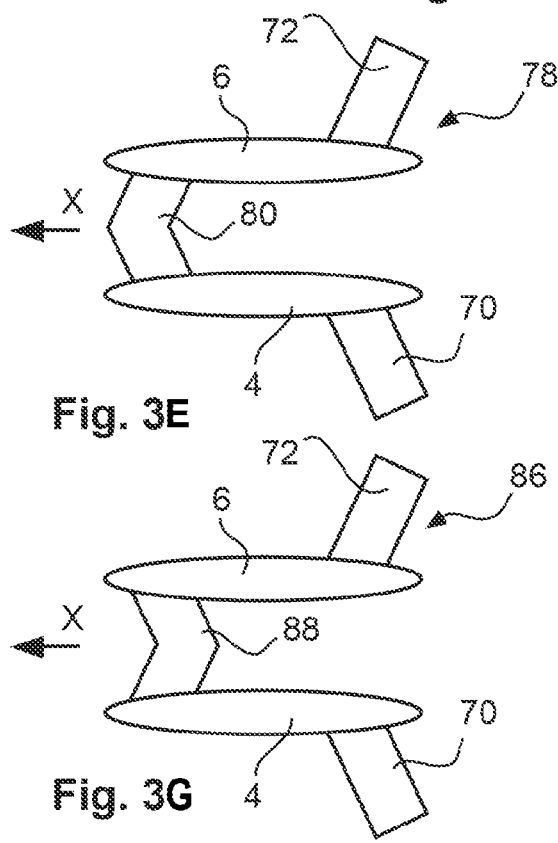
Fig. 3G

AIRCRAFT HAVING AT LEAST TWO AIRCRAFT FUSELAGES AND A FIRST WING ARRANGEMENT WITH AT LEAST TWO WING SECTIONS THAT ARE NOT CONNECTED TO EACH OTHER

CROSS-REFERENCE TO RELATED APPLICATIONS

This application claims priority to German Patent Application No. 10 2012 002 310.3, filed Feb. 6, 2012 and to U.S. Provisional Patent Application No. 61/595,369, filed Feb. 6, 2012, which are incorporated herein by reference in their entirety.

TECHNICAL FIELD

The technical field relates to an aircraft having at least two aircraft fuselages.

BACKGROUND

A predominant number of aircraft in the state of the art comprise a single aircraft fuselage on which a wing and a tail unit are arranged. The lift necessary for carrying the weight of the aircraft is, as a rule, generated by the wing, wherein the size of the maximum lift increases by the square of the flight speed and proportionally to the area of the wing. In order to attain an equilibrium of forces and moments in flight it is necessary for the lifting force and the forces generated by the tail unit to form an equilibrium of moments and forces on the center of gravity of the aircraft. Intrinsic stability of an aircraft is achieved when the center of gravity of the aircraft in the direction of flight is in front of the point at which the air forces act, which air forces are caused by the change in the state of equilibrium. Any disturbances in the longitudinal movement then result in the aircraft automatically moving back to a stable position. The equilibrium of moments and forces is achieved in that a horizontal stabilizer unit generates downthrust. As a rule, this downthrust needs to be intensified when for high-lift states the wing increases its lifting force. Thus the total lift of the aircraft is composed of the lift of the wing and of the downthrust of the horizontal stabilizer unit. Furthermore, this means that the downthrust of a horizontal stabilizer unit reduces the overall carrying capacity.

Furthermore, aircraft having a so-called canard configuration are known, in which the horizontal stabilizer units are arranged on a nose of the aircraft fuselage, and the wings are arranged on a tail of the fuselage. In this arrangement the entire lift of the aircraft is determined by the lift both of the wing and of the horizontal stabilizer unit. However, in this arrangement the wing is always in the downwash of the horizontal stabilizer unit, and consequently, due to the associated disturbance, the aerodynamic resistance is increased and the lift per surface area of the rear surface is reduced. For this reason in such configurations the wing area needs to be increased in order to achieve the same carrying capacity.

U.S. Pat. No. 3,884,432 discloses an aircraft having two separate fuselages, a wing arranged between the fuselages, and vertical and horizontal stabilizer units arranged on the fuselages towards the tail.

In addition, other objects, desirable features and characteristics will become apparent from the subsequent summary and detailed description, and the appended claims, taken in conjunction with the accompanying drawings and this background.

SUMMARY

According to various exemplary embodiments, provided is an aircraft which is as lightweight as possible in which the management of moments and forces of a longitudinal movement of the aircraft can be achieved without downthrust-generating components, and in which mutual negative disturbance of aerodynamic surfaces is avoided.

In one exemplary embodiment the aircraft comprises at least two separate aircraft fuselages; a first wing arrangement with at least two non-connected wing sections; and a second wing, wherein in each case the wing sections of the first wing arrangement extend from the outside of an aircraft fuselage towards the outside, and the second wing is arranged between the at least two aircraft fuselages, wherein connecting regions of the first wing arrangement and of the second wing are arranged so as to be offset relative to each other at least on an X-Z-plane of an aircraft-fixed coordinate system.

By using at least two aircraft fuselages the payload is distributed from one fuselage to two fuselages. In the context of this document the term "fuselage" or "aircraft fuselage" refers to a structural element of the aircraft, which structural element generally carries the payload or a structural load, wherein the primary task of said structural element does not relate to generating lift or downthrust. It is not mandatory for a fuselage to comprise a passenger cabin. Furthermore, the necessary lift is provided by two wings or wing arrangements. With such an arrangement it is possible to achieve an unchanged overall span of the aircraft when compared to the wingspan of conventional aircraft with a single fuselage and a single wing.

Because of the existing spatial distance between the two aircraft fuselages the wing sections of the first wing arrangement are thus shorter than the wing halves in a conventional configuration. This results not only in lesser normal forces, but also in lesser flexural moments on the wing sections of the first wing arrangement when compared to those of a conventional aircraft, and consequently a weight-saving design of the wing sections becomes possible. The design of the wing sections substantially corresponds to the design of a conventional wing half. However, particularly noteworthy is the absence of any connection by way of a wing box or similar devices.

The second wing can be of a single-part or a multi-part design and can also comprise several wing sections. However, the aforesaid are generally interconnected and are, for example, connected to two directly opposing lateral surfaces of an aircraft fuselage.

As a result of the offset between the first wing arrangement and the second wing relative to each other it is also possible to determine the management of moments and forces relating to the longitudinal movement of the aircraft without determining an independent horizontal stabilizer unit, exclusively by influencing the respective lift by means of flaps or other devices.

Offsetting connecting regions at least on an X-Z-plane involves offsetting in the longitudinal direction of the aircraft (X-axis) and/or along a vertical axis of the aircraft. Furthermore, connecting regions can be offset on a transverse axis of the aircraft, which due to the positioning of a second wing on the inside between two fuselages and the first wing arrangement on the outside of two fuselages may be necessary in many embodiments.

The entire wing area required for lift is jointly determined by the areas of the two wings. Since, furthermore, the second wing is arranged between the at least two aircraft fuselages, the wing sections of the first wing arrangement are however arranged exclusively at the outside, substantially no influencing of the flow around the first wing arrangement results from the downwash of the second wing or vice versa. The entire wing area can thus be dimensioned as is the case in the usual commercial aircraft in a conventional configuration with a separate horizontal stabilizer unit in the tail region. There is thus no need to provide an increase in area, as is necessary in canard configurations.

Furthermore, the use of two aircraft fuselages is associated with an advantage in that the boarding and disembarking processes are significantly accelerated because double the number of aisles are available.

While it is expedient to design the exemplary embodiments described in this document so that they are symmetrical relative to individual axes of an aircraft-fixed coordinate system, this is, however, not to be considered to be mandatory. Generally speaking, the present disclosure also comprises aircraft configurations that are asymmetrical at will.

In one exemplary embodiment the first wing arrangement is arranged in a tail region of the at least two aircraft fuselages, and the second wing is arranged in a forward-directed region, wherein the center of gravity of the aircraft is situated between the first wing arrangement and the second wing. In this manner a configuration without a horizontal stabilizer unit is arranged, which configuration is particularly simple in design and ensures particularly good rigidity of the aircraft.

In one exemplary embodiment the first wing arrangement is arranged in a nose region of the at least two aircraft fuselages while the second wing is arranged in a rearward-directed region. Thus, from its outer appearance the aircraft to some extent resembles a canard configuration, however with the significant advantage in that the second wing is not influenced by the downwash of the first wing arrangement.

In one exemplary embodiment at least one engine is arranged on the second wing. The engines are thus situated between the at least two aircraft fuselages. Due to the relatively closely-adjacent arrangement, in the case of failure of one of the engines only relatively small yaw needs to be compensated for. This makes it possible to reduce the size of a vertical stabilizer surface.

In one exemplary embodiment the at least one engine is arranged on the underside of the second wing. In particular in the case of a higher position of the second wing the at least one engine is then situated directly on the gravity axis and results in particularly favorable thrust behavior.

In one exemplary embodiment the at least one engine is arranged at the top of the second wing. This is particularly advantageous if the second wing is arranged in a lower position.

In one exemplary embodiment the second wing is arranged in a tail region on the aircraft fuselages, wherein at least one engine is arranged on the underside of the second wing between the aircraft fuselages. In addition to the slight influencing of yaw stability, the thrust axis can almost or completely coincide with the center of gravity axis. Thus only slight or no thrust-induced moments around the cross axis of the aircraft need to be compensated for.

In one exemplary embodiment there are vertical stabilizer surfaces that extend perpendicularly from the top of the at least two aircraft fuselages to the wingtips of the second wing in order to provide lateral stability to the aircraft.

In one exemplary embodiment vertical stabilizer surfaces are arranged on the outermost wingtips of the wing sections of the first wing arrangement, which vertical stabilizer surfaces during symmetric flight serve as winglets to reduce drag. The vertical stabilizer surfaces can be planar at least in part and can extend at an angle from the wing section in question. In one variant the vertical stabilizer surfaces are aligned at least with the planar part parallel to the longitudinal axis.

In one exemplary embodiment the second wing is swept. For example, the second wing may be symmetrically swept and thus comprise a kink so that the second wing remotely resembles a boomerang. In this arrangement the kink may face either forwards or rearwards. Thus engines on the second wing may be attached in such a manner that they can be used to advantage in determining the overall center of gravity position of the aircraft.

In one exemplary embodiment at least one landing gear is provided that is integrated in at least one of the at least two aircraft fuselages. This is associated with an advantage in that the load impact experienced during landing or take-off cycles does not have to be absorbed by way of the individual wings or wing sections. In addition to the aforesaid it is possible, in each case, to design the nose gear and the main landing gear so that it is symmetrical, which significantly facilitates both production and maintenance.

In one exemplary embodiment one of the at least two aircraft fuselages comprises a nose design that is transparent at least in some regions. In this way special places in the aircraft can be provided that provide an outstanding panoramic view to a passenger.

In one exemplary embodiment a third aircraft fuselage is provided that is arranged between two outer aircraft fuselages. This third aircraft fuselage can be arranged in the symmetry plane and can accommodate a cockpit so that the pilots of the aircraft can sit in the symmetry plane.

Furthermore, a nose of one of the at least two aircraft fuselages can comprise a cockpit. The other aircraft fuselage or fuselages can be designed as required.

It is understood that the aircraft comprises at least two fuselages that are generally arranged so as to be offset relative to each other along an X-Y-plane. In one example, in this arrangement a first fuselage and a second fuselage are spaced apart from each other only in the transverse direction, i.e. along the Y-axis of an aircraft-fixed coordinate system. Furthermore, the aircraft can comprise a third, fourth, fifth, sixth or seventh fuselage, wherein all the fuselages are separate and, for example, are arranged so as to be offset from each other at least on an X-Y-plane. In addition to this, they can be offset from each other along an X-Z-plane. Furthermore, the arrangement of any or all the fuselages need not be symmetrical.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIGS. 3A to 3G show top views of various diagrammatic configurations without vertical stabilizer units.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
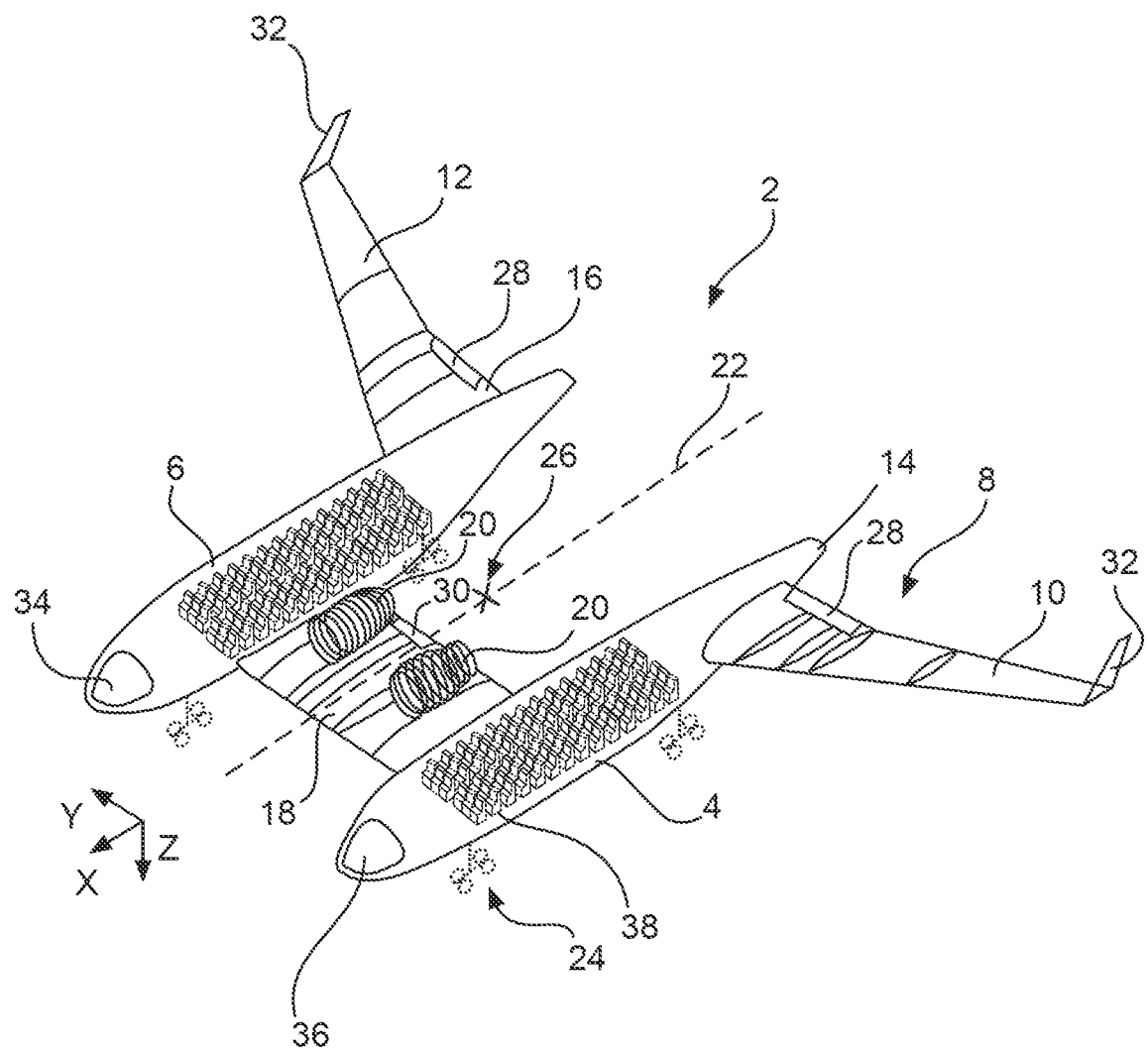
FIG. 1 shows a three-dimensional view of an exemplary embodiment of an aircraft.

FIG. 1 shows an exemplary embodiment of an aircraft 2 according to the present disclosure, which aircraft 2 comprises a left-hand aircraft fuselage 4, a right-hand aircraft fuselage 6, a first wing arrangement 8 with a left-hand wing section 10 and a right-hand wing section 12 which are arranged on a rearwards-directed region of the left-hand aircraft fuselage 4 and of the right-hand aircraft fuselage 6. The wing sections 10 and 12 in each case comprise a connecting region 14 and 16, which in the case shown are connected to a sideways-directed area of the aircraft fuselages 4 and 6.

The aircraft fuselages 4 and 6 are spaced apart from each other in the Y-direction, for example arranged largely parallel to each other, and enclose a second wing 18 that extends between two facing lateral surfaces of the aircraft fuselages 4 and 6. At the same time the second wing 18 is spaced apart from the first wing 8 in the X-direction, i.e. it is arranged so as to be offset towards the nose. Accordingly there is a gap between the connecting regions 14 and 16 of the wing sections 10 and 12. This prevents disturbing the airflow as a result of the downwash of the second wing 18.

Arranged on the second wing 18 are two engines 20, each providing thrust separately, with the thrust axis of said engines 20 being spaced apart only a small distance from a gravity axis 22. Thus if one of the two engines 20 has an issue, only relatively minor yaw moment arises, which means that smaller vertical stabilizer surfaces suffice to achieve lateral stability or yaw stability.

The arrangement of the second wing 18 between the two aircraft fuselages 4 and 6 and the attachment in each case to an inwards-directed lateral surface results in particularly good rigidity of the aircraft 2 in the X-Y-plane. In order not to compromise the integrity of the first wing arrangement 8 and of the second wing 18, exclusively the aircraft fuselages 4 and 6 each comprise extendable landing gear arrangements 24 (for the sake of simplicity shown in dotted lines). All the loads arising during landing or taxiing are spread to both aircraft fuselages 4 and 6.

As shown in FIG. 1, the aircraft 2 can be implemented without a separate horizontal stabilizer unit. The center of gravity 26 is situated on the gravity axis 22 between the first wing arrangement 8 and the second wing 18. Management of moments and forces can be effected with the use of flaps 28 on the wing sections 10 and 12 and one or several flaps 30 on the second wing 18. An increase in the angle of attack may, for example, be achieved by deflecting flaps 28 of the first wing arrangement 8 towards the top, because the curvature of the wing sections 10 and 12 decreases, lift decreases correspondingly, and a tilting movement on a transverse axis takes place. In a reverse variant by deflecting the flaps 28 towards the bottom the lift at the wing sections 10 and 12 can be increased so that a pivoting movement in the other direction takes place. At the same time or as an alternative to the aforesaid, by pivoting the flap 30 the lift on the second wing 18 can be influenced in order to, in this manner, vary the pitch attitude of the aircraft 2. It is not necessary to use a horizontal stabilizer unit that causes constant downthrust.

The lateral movement can in particular be controlled by opposed excursion of the flaps 28 on the wing sections 10 and 12 so that the flaps 28 serve as ailerons. In this way it is relatively easy to produce a moment on a longitudinal axis.

If it is necessary to carry out yaw compensation on a vertical axis, for example in the case of failure of one of the engines 20, or in the case of side wind, the aircraft 2 may, for example, comprise vertical stabilizer surfaces 32 that are arranged so as to be rigid on the wing sections 10 or 12, may comprise a pivotable flap, or may comprise a bearing arrangement so as to be completely pivotable. Apart from the function of a rudder, in a neutral state with symmetrical flight vertical stabilizer surfaces 32 may also reduce the wingtip flow, and thus may, in particular, reduce the induced drag.

Since in the variant shown the aircraft 2 comprises a total of two aircraft fuselages 4 and 6 the pilots are not seated directly on a symmetry plane of the aircraft 2, but instead laterally offset relative to the gravity axis 22. In the example shown, for example the right-hand aircraft fuselage 6 may comprise the cockpit 34 while the left-hand aircraft fuselage 4 comprises a nose design 36 that is transparent at least in some region. Passengers seated behind the aforesaid in passenger seats 38 enjoy a very good panoramic view from the aircraft 2.

Figure 2:
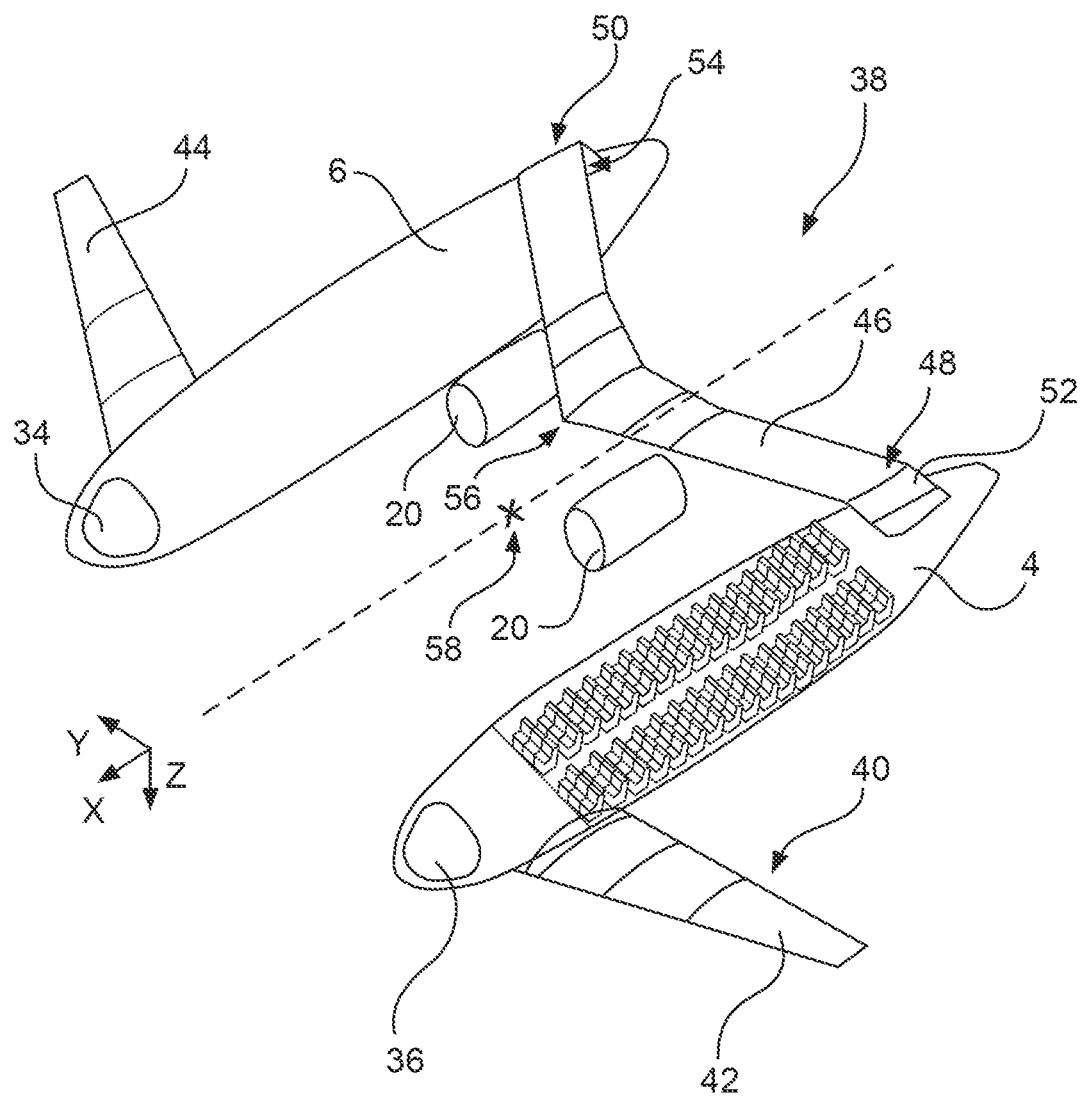
FIG. 2 shows a three-dimensional view of an exemplary embodiment of an aircraft.

FIG. 2 shows another exemplary embodiment in the form of an aircraft 38 that also comprises a left-hand fuselage 4 and a right-hand fuselage 6, which are, however, finished in a manner that differs to that of the aircraft 38. A first wing arrangement 40 with a left-hand wing section 42 and a right-hand wing section 44 towards the nose end are situated in a front region of the aircraft fuselages 4 and 6 where they are attached to lateral surfaces. Towards the tail end a second wing 46 extends from the top of the left-hand fuselage 4 to the top of the right-hand fuselage 6, thus interconnecting the two aircraft fuselages 4 and 6. In a connecting region 48 or 50 of the second wing 46 in each case there are vertical stabilizer surfaces 52 and 54 that extend perpendicularly from the connecting regions 48 and 50, i.e. from outer wing tips of the second wing 46 to the top of the aircraft fuselages 4 and 6. These vertical stabilizer surfaces 52 and 54 provide lateral stability to the aircraft 38.

The second wing 46 is symmetrically swept, thus comprising a kinked shape wherein the sweep angles substantially correspond to the sweep angles of the left-hand and the right-hand wing sections 42 and 44. In this arrangement a kink 56 in the X-direction points in the direction of the nose region so that the engines 20 at the bottom of the second wing 46 largely extend in the direction of the center of gravity 58 of the aircraft 38. In this manner particularly little influence on the flight stability at asymmetric thrust can be achieved. In a manner similar to that in FIG. 1 the vertical stabilizer surfaces 52 and 54 can comprise a pivotable flap at their end facing away from the direction of flight in order to generate yaw moment.

FIGS. 3A to 3G show top views of several exemplary embodiments of various configurations of the aircraft according to the present disclosure, in each case with a first wing arrangement with two wing sections and a second wing.

FIG. 3A shows an aircraft 60 with two wing sections 62 and 64 arranged towards the rear without significant sweep, which wing sections 62 and 64 form a first wing arrangement, and a second unswept wing 66, offset towards the front, i.e. in the X-direction between two aircraft fuselages 4 and 6. Apart from the lack of sweep this variant corresponds to the exemplary embodiment in FIG. 1. FIG. 3B shows an aircraft 68 with two wing sections 70 and 72 arranged towards the rear and comprising a positive sweep as a first wing arrangement, and a second, unswept wing 66, offset towards the front, between two aircraft fuselages 4 and 6. In FIG. 3C an aircraft 74 comprises unswept wing sections 62 and 64 of a first wing arrangement as well as an unswept second wing 66, wherein this configuration is mirrored on a transverse axis when compared to the configuration shown in FIG. 3A. FIG. 3D shows an aircraft 76 with an arrangement, mirrored on a transverse axis, of swept wing sections 70 and 72 of a first wing arrangement and an unswept second wing 66 from FIG. 3B.

FIG. 3E discloses a modification of FIG. 3B. In this design an aircraft 78 comprises a forward or negatively and symmetrically swept second wing 80 that forms a kink towards the front. FIG. 3G shows an aircraft 86 with a second wing 88 that corresponds to the second wing 80 of the aircraft 78 from FIG. 3E, but is swept in the other direction, i.e. rearward or positively, so that the kink is formed towards aft.

FIG. 3F shows an aircraft 82 with an asymmetric unilaterally swept second wing 84 that extends obliquely between the two aircraft fuselages 4 and 6 and that can be referred to as an "oblique wing". This second wing 84 does not form a kink. The wing sections 70 and 72 of a first wing arrangement correspond to those of FIGS. 3B, 3E and 3G.

In addition, FIGS. 4A to 4G show three-dimensional views of the possible arrangements of additional aircraft fuselages and vertical stabilizer units. For the sake of simplicity all the wings or wing sections are shown unswept and merely diagrammatically. Of course, the characteristics shown also apply to swept wings and wing sections.

Figure 4A:
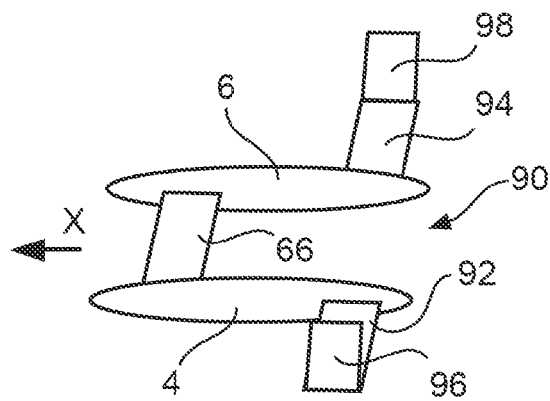
FIGS. 4A to 4G show three-dimensional views of various diagrammatic configurations with vertical stabilizer units.

FIG. 4A shows an aircraft 90 with a second wing 66, arranged towards the front, and two wing sections 92 and 94, arranged towards the rear, as a first wing arrangement. On the outermost wingtips of the wing sections, vertical stabilizer surfaces 96 and 98 are arranged which while in the diagram shown extend substantially perpendicularly from the wing sections 92 and 94 can, however, generally-speaking also be arranged at an angle from the aforesaid.

Figures 4B, 4C:
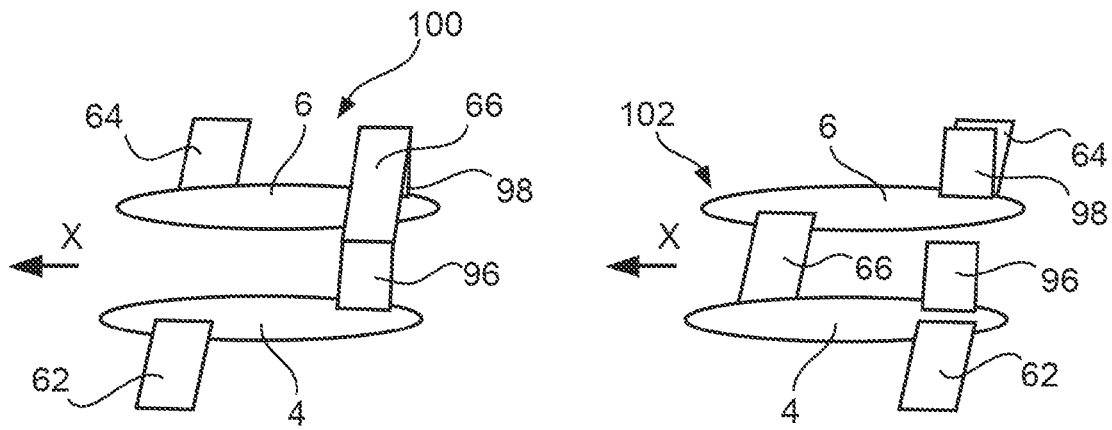

FIG. 4B discloses an aircraft 100 that substantially corresponds to the aircraft 74 of FIG. 3C, except that it comprises two vertical stabilizer surfaces 96 and 98 that extend from the tops of the aircraft fuselages 4 and 6 to outer wingtips of a second wing 66 arranged above the aforesaid. As an alternative, FIG. 4C shows an aircraft 102 that corresponds to the aircraft 90 of FIG. 4A, wherein the vertical stabilizer surfaces 96 and 98 are, however, arranged directly on the aircraft fuselages 4 and 6, and two wing sections 62 and 64 as a first wing arrangement extend from the aircraft fuselages 4 and 6 towards the outside.

Figure 4D:
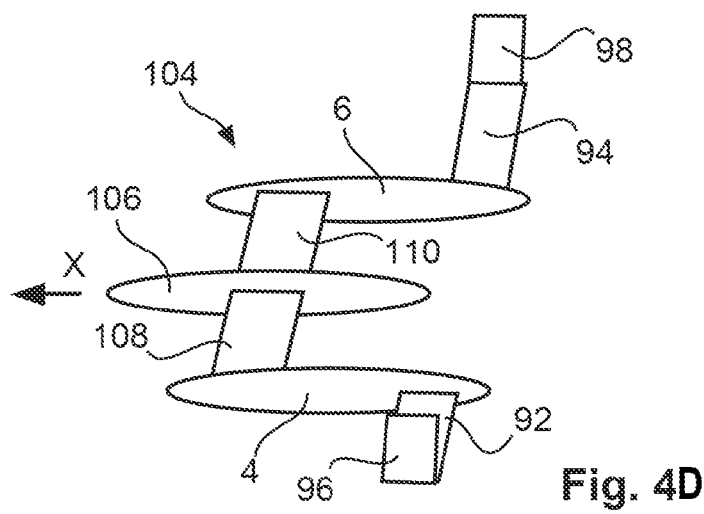

In order to provide a cockpit for pilots that is situated in the symmetry axis, the aircraft 104 shown in FIG. 4D comprises a third aircraft fuselage 106 that is situated in the middle between the spaced-apart aircraft fuselages 4 and 6. From this third aircraft fuselage 106, wing sections 108 and 110 extend towards the outside to the aircraft fuselages 4 and 6, thus forming the second wing or a second wing arrangement.

Figure 4E:
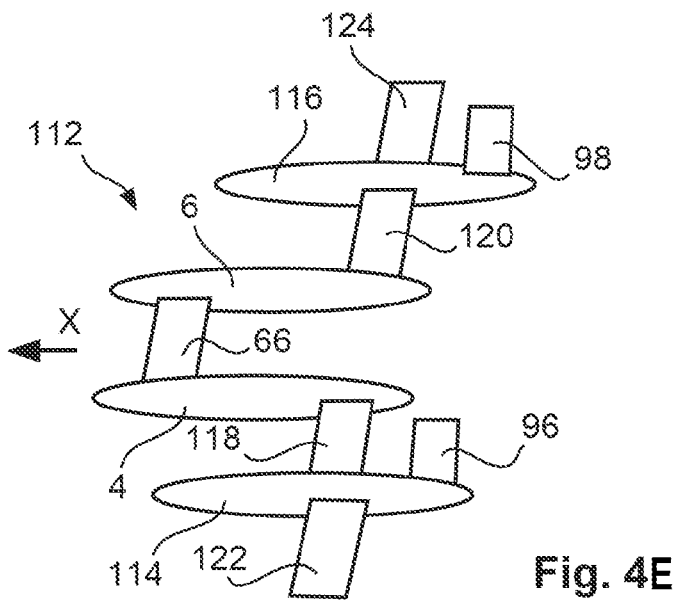

FIG. 4E shows a modification of the aircraft 104, in which modification an aircraft 112 comprises a total of four aircraft fuselages 4, 6, 114 and 116, wherein between the aircraft fuselages 4 and 6 towards the front a second wing 66 is arranged, and towards the outside, arranged so as to be offset towards the rear and spaced apart from the aircraft fuselages 4 and 6 in the Y-direction, the aircraft fuselages 114 and 116 are arranged. Wing sections 118 and 120 of a first wing arrangement extend between the aircraft fuselages 4 and 114 as well as 6 and 116. Further wing sections 122 and 124 of the first wing arrangement extend from the outer aircraft fuselages 114 and 116 towards the outside. For example towards the rear, vertical stabilizer surfaces 96 and 98 are arranged on the outer aircraft fuselages 114 and 116.

Figure 4F:
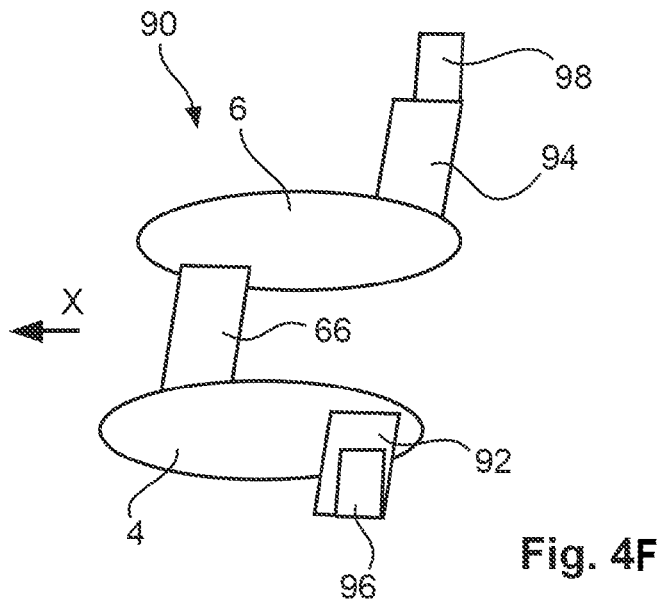
Figure 4G:
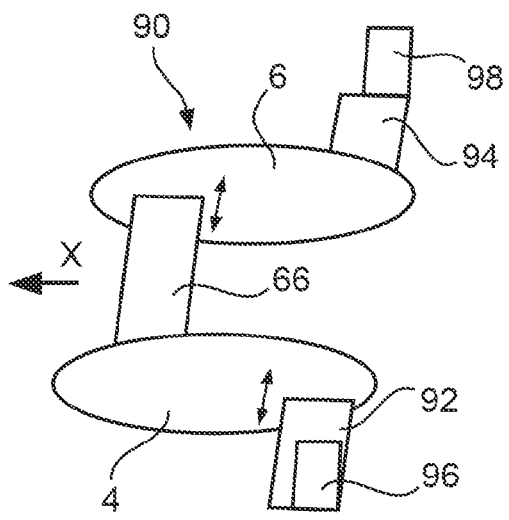

The positions of the first wing arrangement and of the second wing, which positions are to be selected in the Z-direction, are variable. High-wing, mid-wing and low-wing aircraft configurations are imaginable, as are mixtures thereof. As examples, FIGS. 4F and 4G show variable connection options of wing sections 92 and 94 or of a second wing 66. The aircraft 90 has been selected as an example of this; the same applies to all the other configurations shown.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. An aircraft, comprising:
   at least two separate aircraft fuselages;
   a first wing arrangement with at least two non-connected wing sections that extend outwardly from an exterior of one of the at least two aircraft fuselages; and
   a second wing arranged between the at least two aircraft fuselages,
   wherein connecting regions of the first wing arrangement and of the second wing are arranged so as to be offset relative to each other at least on an X-Z-plane of an aircraft-fixed coordinate system, and
   wherein at least one engine is coupled to the second wing, and
   wherein the first wing arrangement is arranged in a tail region of the at least two aircraft fuselages, and the second wing is arranged in a forward-directed region of the aircraft, and the center of gravity of the aircraft is situated between the first wing arrangement and the second wing.

2. The aircraft of claim 1, wherein the at least one engine is arranged at the top of the second wing.

3. The aircraft of claim 1, further comprising vertical stabilizer surfaces arranged on outer wingtips of the wing sections of the first wing arrangement.

4. The aircraft of claim 1, wherein the second wing is swept.

5. The aircraft of claim 1, further comprising at least one landing gear that is integrated in at least one of the at least two aircraft fuselages.

6. The aircraft of claim 1, wherein one of the at least two aircraft fuselages further comprises a nose design that is transparent at least in some regions.

7. The aircraft of claim 1, further comprising a third aircraft fuselage that is arranged between the at least two aircraft fuselages.

8. The aircraft of claim 1, wherein a nose of one of the at least two aircraft fuselages comprises a cockpit.

9. An aircraft, comprising:
   at least two separate aircraft fuselages, with a nose of one of the at least two aircraft fuselages including a cockpit;
   a first wing arrangement with at least two non-connected wing sections that extend outwardly from an exterior of one of the at least two aircraft fuselages;
   a second wing arranged between the at least two aircraft fuselages; and
   vertical stabilizer surfaces arranged on outer wingtips of the wing sections of the first wing arrangement,
   wherein connecting regions of the first wing arrangement and of the second wing are arranged so as to be offset relative to each other at least on an X-Z-plane of an aircraft-fixed coordinate system.

10. The aircraft of claim 9, wherein the second wing is swept.

11. The aircraft of claim 9, further comprising at least one landing gear that is integrated in at least one of the at least two aircraft fuselages.

12. The aircraft of claim 9, wherein one of the at least two aircraft fuselages further comprises a nose design that is transparent at least in some regions.

13. An aircraft, comprising:
at least two separate aircraft fuselages,
a first wing arrangement with at least two non-connected wing sections that extend outwardly from an exterior of one of the at least two aircraft fuselages;
a second wing arranged between the at least two aircraft fuselages;
a third aircraft fuselage that is arranged between the at least two aircraft fuselages, with a nose of the third aircraft fuselage including a cockpit, and
wherein connecting regions of the first wing arrangement and of the second wing are arranged so as to be offset relative to each other at least on an X-Z-plane of an aircraft-fixed coordinate system.

* * * * *